US011230215B2

(12) United States Patent
    Cochet

(10) Patent No.: US 11,230,215 B2
(45) Date of Patent: Jan. 25, 2022

(54) TILTABLE TRAILER COMPRISING MECHANICAL ACTUATION MEANS AND HIGH-POSITION LOCKING MEANS

(71) Applicant: COCHET, Souge le Ganelon (FR)

(72) Inventor: Ludovic Cochet, Souge le Ganelon (FR)

(73) Assignee: COCHET, Souge le Ganelon (FR)

( * ) Notice: Subject to any disclaimer, the term of this patent is extended or adjusted under 35 U.S.C. 154(b) by 0 days.

(21) Appl. No.: 16/971,434

(22) PCT Filed: Feb. 22, 2019

(86) PCT No.: PCT/EP2019/054429
    § 371 (c)(1),
    (2) Date: Aug. 20, 2020

(87) PCT Pub. No.: WO2019/162433
    PCT Pub. Date: Aug. 29, 2019

(65) Prior Publication Data
    US 2020/0391644 A1    Dec. 17, 2020

(30) Foreign Application Priority Data
    Feb. 22, 2018   (FR) ...................................... 1851538

(51) Int. Cl.
    *B60P 1/34*    (2006.01)
    *B60B 35/06*   (2006.01)
    (Continued)

(52) U.S. Cl.
    CPC ................ *B60P 1/34* (2013.01); *B60B 35/06* (2013.01); *B60P 1/08* (2013.01); *B62D 63/061* (2013.01);
    (Continued)

(58) Field of Classification Search
    CPC ............. B60P 1/34; B60P 1/08; B62D 63/061
    See application file for complete search history.

(56) References Cited

U.S. PATENT DOCUMENTS 2,807,381 A    9/1957  Tegeler
2,885,216 A *  5/1959  Browning ............ B62D 53/062
                                                    280/43.24
(Continued)

OTHER PUBLICATIONS

International Search Report dated May 29, 2019, for corresponding International Application No. PCT/EP2019/054429, dated Feb. 22, 2019.
(Continued)

*Primary Examiner* — Jonathan Snelting
(74) *Attorney, Agent, or Firm* — David D. Brush; Westman, Champlin & Koehler, P.A.

(57) ABSTRACT

A tiltable trailer that can assume a high, or road, position, and a low loading position in which the trailer is tilted with respect to the ground. The trailer includes wheels; a chassis mounted on an axle that pivots with respect to the wheels; an actuator for actuating the pivoting of the axle relative to the wheels to vary the position of the chassis with respect to the ground, the actuator including a flexible element secured to the axle and a tensioner attached to the chassis for adjusting tension of the flexible element; and a lock for locking the trailer in the high position, which is separate from the actuator. The lock includes a sliding locking bar, a first end of which is secured to the axle and a second end of which cooperates with a locking mechanism, mounted on the chassis, when the trailer is in the high position.

11 Claims, 10 Drawing Sheets

(51) Int. Cl.
  *B60P 1/08*   (2006.01)
  *B62D 63/06*  (2006.01)
  *B60D 1/66*       (2006.01)
  *B60P 3/077*      (2006.01)

(52) U.S. Cl.
  CPC ............ *B62D 63/062* (2013.01); *B60D 1/665* (2013.01); *B60P 3/077* (2013.01)

(56) References Cited

U.S. PATENT DOCUMENTS

| | | | |
|---|---|---|---|
| 3,811,697 A | 5/1974 | Armstrong | |
| 4,077,643 A | 3/1978 | Bates | |
| 5,975,828 A | 11/1999 | Weldy | |
| 7,540,528 B2* | 6/2009 | Spainhower | B62D 63/061 |
| | | | 280/415.1 |
| 8,172,248 B2* | 5/2012 | Groves | B60P 1/027 |
| | | | 280/414.5 |
| 8,272,829 B1* | 9/2012 | Rupp | B60P 1/027 |
| | | | 414/485 |
| 8,376,391 B2* | 2/2013 | Voves | B62B 1/12 |
| | | | 280/656 |
| 8,820,767 B1* | 9/2014 | Osborne | B60G 17/017 |
| | | | 280/414.1 |
| 9,452,649 B2* | 9/2016 | Tortellier | B60P 1/027 |
| 10,369,917 B2* | 8/2019 | Reid | B62D 63/08 |
| 2005/0067799 A1 | 3/2005 | Smith | |
| 2005/0184485 A1 | 8/2005 | Timmermans | |
| 2006/0045693 A1 | 3/2006 | Elliot et al. | |
| 2012/0020762 A1 | 1/2012 | Roose | |
| 2015/0123378 A1 | 5/2015 | Tortellier | |

OTHER PUBLICATIONS

Written Opinion of the International Searching Authority dated May 29, 2019, for corresponding International Application No. PCT/EP2019/054429, filed Feb. 22, 2019.

English translation of the Written Opinion of the International Searching Authority dated May 29, 2019 for corresponding International Application No. PCT/EP2019/054429, filed Feb. 22, 2019.

* cited by examiner

TILTABLE TRAILER COMPRISING MECHANICAL ACTUATION MEANS AND HIGH-POSITION LOCKING MEANS

1. CROSS-REFERENCE TO RELATED APPLICATIONS

This Application is a Section 371 National Stage Application of International Application No. PCT/EP2019/054429, filed Feb. 22, 2019, which is incorporated by reference in its entirety and published as WO 2019/162433 A1 on Aug. 29, 2019, not in English.

2. FIELD OF THE INVENTION

The field of the invention is that of tiltable trailers.

More specifically, the invention relates to a tiltable trailer allowing a user to load and unload, by himself/herself, bulky and heavy objects, such as motorcycles, household appliances, or gardening machinery (for example a ride on lawn mower, a compact tractor), etc.

3. BACKGROUND ART

Different types of trailers are known in the prior art, allowing a single person to load and unload bulky and heavy objects using a hand truck.

For example, U.S. Pat. No. 5,975,828 proposes such a trailer comprising a drawbar mounted such that it is rigidly connected to the chassis of the trailer, in addition to a chassis tipping system.

Such a tipping system comprises a single cable attached to the centre of an axle, controlling the tipping or lifting of the chassis as a function of the tension exerted on the cable.

Another drawback of this known solution is that, since the cable is mounted at the centre of the axle, it tends to become deformed when the cable is tensioned and when a heavy load is positioned on the trailer.

Yet another drawback of this known solution is that the tension in the cable is managed by an electronic device which requires a power supply.

Yet another drawback of this known solution is that the tension in the cable must be regularly checked to prevent unwanted tipping of the chassis, in particular when driving.

Yet another drawback of this known solution is that braking means must be used to slow the speed at which the chassis is lowered.

Other techniques presented in the patent documents US2006/0045693, US2012/0020762, US 2005/0067799, and IE 2006/0467 have been developed.

However, these techniques also suffer from drawbacks similar to those described hereinabove.

Moreover, these techniques are relatively complex to implement and require numerous modifications to be made to a conventional trailer.

Furthermore, some of these techniques implement a cylinder controlling the displacement of the chassis relative to the ground, which increases the trailer production costs.

4. DESCRIPTION OF THE INVENTION

For this purpose, the invention relates to a tiltable trailer that can assume a high, or road, position, and a low loading position in which the trailer is tilted with respect to the ground, the trailer comprising a chassis resting on the ground on wheels, the chassis being mounted on an axle that pivots with respect to said wheels.

According to the invention, the trailer further comprises:
means for actuating the pivoting of said axle relative to the wheels in such a way as to vary the position of said chassis with respect to the ground, said actuation means comprising at least one flexible element rigidly connected to said axle, said flexible element being a strap or a cable, and a device for adjusting the tension of said flexible element attached to said chassis, and
means for locking the trailer in the high position, separate from the actuation means, comprising a sliding locking bar, a first end whereof is rigidly connected to said axle and a second end whereof is intended to cooperate with a locking mechanism, mounted on said chassis, when the trailer is in the high position.

The invention thus proposes a tiltable trailer in which the system for lifting and lowering the bed comprises a flexible element, such as a cable or a strap attached to the axle, controlling the pivoting thereof and the movements of the chassis as a function of the tension exerted on the cable or the strap.

The expression "flexible" is contrary to "stiff" here and thus indicates an ability of the cable or of the strap to be tensioned or relaxed, i.e. to be more or less taut.

Advantageously, the tensioning of the cable or of the strap is managed by a mechanical device, such as a winch or a ratchet tensioner respectively, which are not very expensive.

Moreover, the trailer implements means for locking the trailer in the high position, separate from the means controlling the lifting and lowering of the trailer.

These locking means take the form of a locking bar or rod which reduces the stresses on the axle when the cable or the strap is tensioned with the trailer in the high position.

This bar allows the axle to be held in the high position.

In this manner, unwanted lowering of the chassis, in particular when driving, is prevented.

These locking means reduce the mechanical stresses on the axle with the trailer in the high position and the wear caused to the cable or the strap.

The solution of the invention does not require the implementation of a cylinder and is thus less expensive.

According to a specific aspect of the invention, when said flexible element is a strap, said tension-adjusting device is a ratchet tensioner.

According to a specific aspect of the invention, when said flexible element is a cable, said tension-adjusting device is a winch for winding said cable.

These two alternative implementations are reliable, not very complex and are cost-effective.

According to a specific aspect of the invention, the second end of the locking bar comprises a slot in which a locking pin is intended to be housed when the trailer is in the high position.

The manual locking of the trailer in the high position can be carried out by the operator in a single operation. Unlocking is also facilitated since the locking pin is simply removed to displace the locking bar and allow the axle to move.

According to a specific aspect of the invention, said chassis comprises a first frame, referred to as a rear frame, connected, such that it pivots, to a second frame, referred to as a front frame, so as to allow said trailer to be folded.

The overall dimensions of the trailer are thus reduced so that it can be stored in a garage for example.

According to a specific aspect of the invention, the rear frame of the chassis is connected to the front frame by means of connection means situated on either side of said trailer, said connection means supporting a swivel pin for pivoting the rear frame relative to the front frame.

According to a specific aspect of the invention, said connection means have a space situated between said rear and front frames, intended to receive said axle when the trailer is in the low position.

According to a specific aspect of the invention, the trailer further comprises a retractable stand mounted on said chassis.

Such a stand allows the trailer to be held vertical when the trailer is in the storage position, i.e. when the front and rear frames of the chassis are folded back and facing one another.

According to a specific aspect of the invention, the trailer comprises a drawbar supporting a hitch tongue rigidly connected to said chassis by way of a pivot link allowing said drawbar to be folded back relative to said chassis.

This possibility of folding back the drawbar reduces the overall dimensions of the trailer, in particular in the storage position.

According to a specific aspect of the invention, the trailer comprises suspension means situated inside said axle.

These suspension means, such as rubber elements, improve the stability of the trailer.

According to a specific aspect of the invention, said axle comprises an outer tube in which an inner tube is mounted, each of the ends whereof is rigidly connected to a wheel, the chassis being rigidly connected to the outer tube.

5. LIST OF FIGURES

Other features and advantages of the invention will appear upon reading the following description given of non-limiting embodiments thereof, provided for illustration purposes, and with reference to the accompanying drawings, in which:

FIGS. 2 to 4 are different views of the same trailer, in the high position, a portion of the bed not being shown for clarity purposes.

6. DETAILED DESCRIPTION

Identical elements are denoted by the same reference numeral in all figures of the present document.

Moreover, the terms "front" and "rear" refer to the direction of forwards travel of the towing vehicle.

Figure 1A:
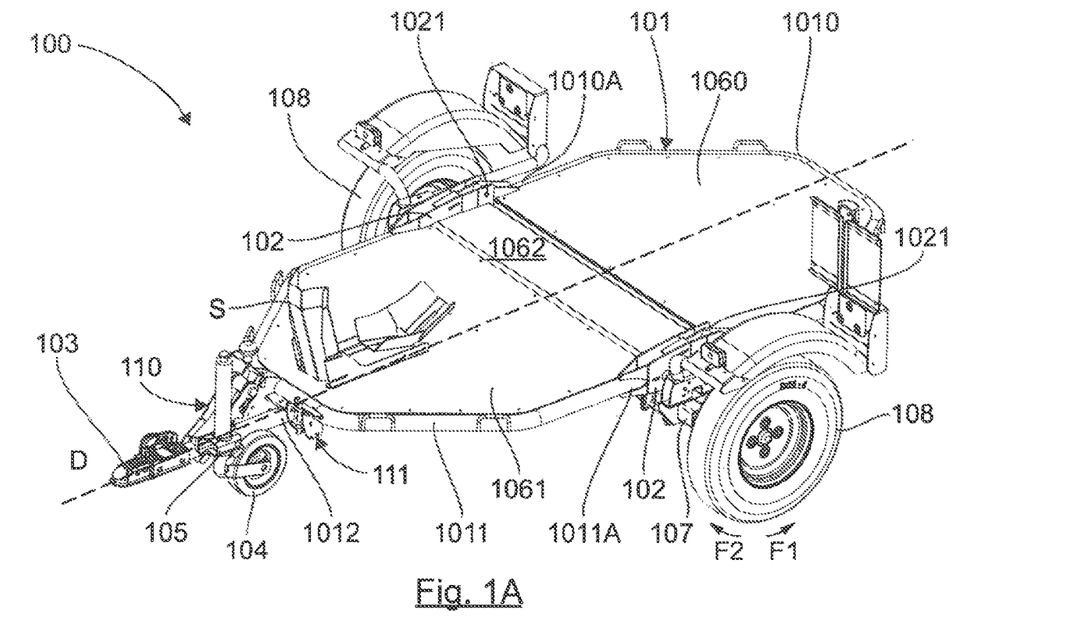
FIGS. 1A and 1B are perspective views of a tiltable trailer according to one embodiment of the invention respectively in the road position (also referred to as the high position) and in the so-called loading position (also referred to as the low position)
Figure 1B:
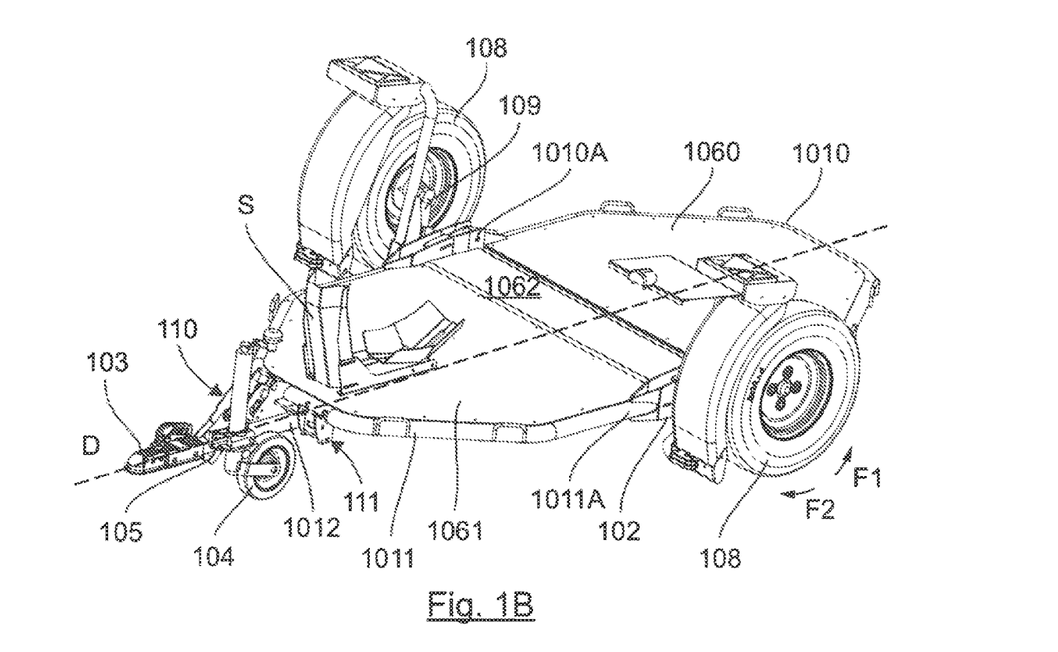

FIGS. 1A and 16 are perspective views of a tiltable trailer according to one specific embodiment of the invention, respectively in the road position (also referred to as the high position) in which the trailer is substantially parallel to the ground, and in the so-called loading position (also referred to as the low position) wherein the trailer is inclined relative to the ground.

More specifically, the trailer 100, in this embodiment of the invention, is provided with a chassis 101 in two parts, i.e. a rear chassis and a front chassis.

The rear chassis comprises a first frame, referred to as a rear frame 1010, and the front chassis comprises a second frame, referred to as a front frame 1011.

As shown, the rear frame 1010 and front frame 1011 each have a substantially "U" shape, the dimensions whereof, in particular the length whereof, are substantially identical.

The rear frame 1010 and front frame 1011 are hinged relative to one another so as to allow the trailer 100 to be folded (by minimising the overall dimensions thereof during storage), and conversely unfolded.

The right and left ends 1010A of the rear frame 1010 are connected to the right and left ends 1011A of the front frame 1011 by way of connection means 102.

The connection means 102, situated on either side of the trailer 100, comprise a swivel pin 1021 for pivoting the rear frame 1010 relative to the front frame 1011 (and thus the rear chassis relative to the front chassis).

The swivel pins 1021 are coaxial.

Moreover, the trailer comprises a bed attached to the chassis 101.

Such a bed comprises a first portion, referred to as the rear bed 1060, rigidly connected to the rear frame 1010, and a second portion, referred to as a front bed 1061, rigidly connected to the front frame 1011.

The rear bed 1060 and the front bed 1061 are coplanar, the space between these two beds being closed off by a connecting plate 1062 extending between the connection means 102 situated on either side of the trailer, at the wheels thereof.

The plate 1062, which is mounted on the front chassis, is situated in the space formed between the front bed 1161 and rear bed 1060 such that it is substantially coplanar therewith.

In an alternative implementation, no other connecting plate is implemented, the edges of the rear bed 1060 and of the front bed 1061 being disposed facing one another (a predetermined space being provided between the two facing edges).

The longitudinal ends of the plate 1062 are rigidly connected to the connection means 102 situated on either side of the trailer 100.

The trailer 100 further comprises a drawbar 1012, a first end whereof is rigidly connected to the front chassis and the second end whereof is rigidly connected to a hitch tongue 103 allowing the trailer 100 to be attached to a towing vehicle.

A front wheel 104 is mounted on the drawbar 1012 via an adjustment mechanism 105 allowing the height of the front wheel 104, and thus the tilting of the trailer 100, to be adjusted so as to simplify the mounting of the hitch tongue 103 on a towing vehicle.

Figure 5A:
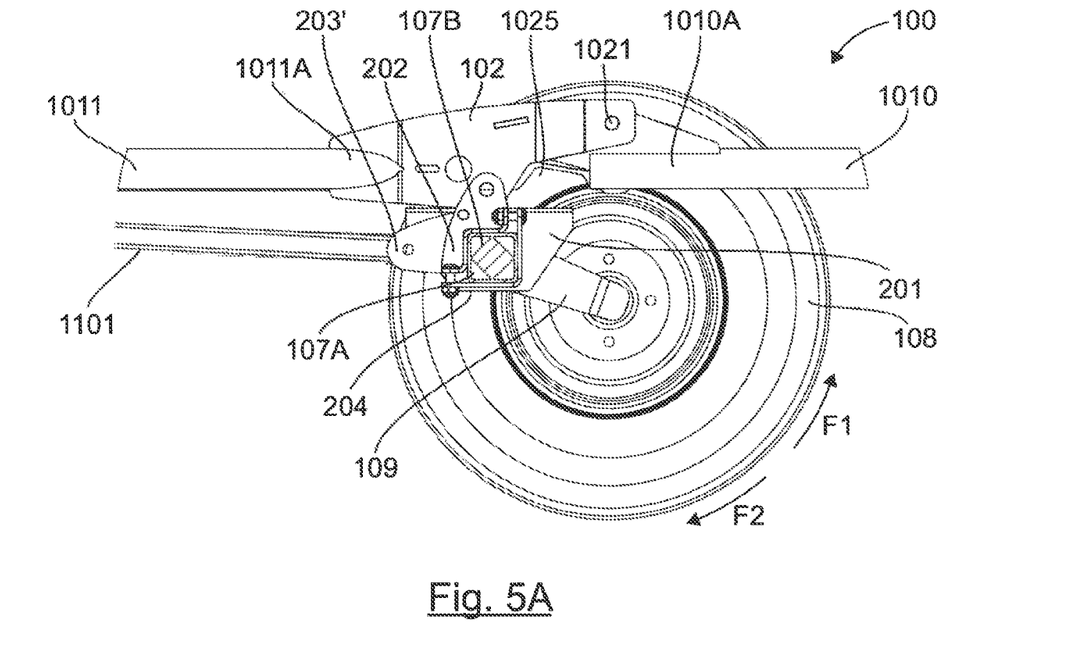
FIGS. 5A and 5B are detailed, section views of the trailer at a lateral wheel, when the trailer is in the high position and in the low position respectively.
Figure 5B:
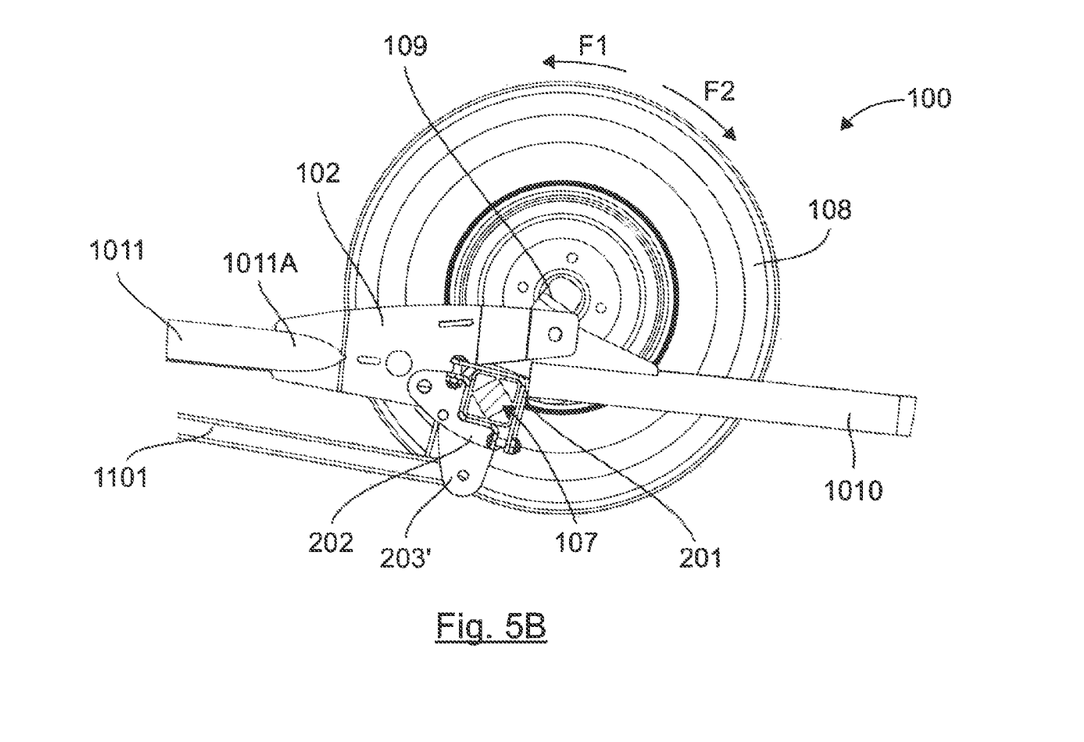

Moreover, the trailer 100 advantageously implements a standard, commercially-available axle 107 (FIG. 5B).

The axle 107 comprises an outer tube 107A with a square cross-section, and an inner tube 107B with a square cross-section, forming a connection tube, connected in a hinged manner at each of the ends thereof to the mechanical arms 109 and support hubs of the wheels 108 (FIG. 5A).

The axle 107 is mounted such that it pivots relative to the wheels 108 of the trailer 100.

Each of the mechanical arms 109 can rotate relative to the centre of a wheel 108 in a clockwise direction $F_2$, and anticlockwise direction $F_1$, so as to cause the trailer 100 to tip from a low position, as shown in FIG. 1B, to a high position, as shown in FIG. 1A, and vice-versa.

The trailer 100 further comprises actuation means 110 for controlling the rotation of the mechanical arms 109 and thus the displacement of the trailer 100 between a first position, referred to as a high position, and a second position, referred to as a low position, and vice-versa.

Advantageously, the trailer 100 comprises locking means 111 for preventing the tipping thereof, which are separate from the actuation means 110.

These locking means 111 allow the rotation of the mechanical arms 109 to be blocked when the trailer 100 is in the high position so as to prevent the trailer 100 from inadvertently passing into the low position.

Thus, when the trailer 100 is in the high position, as shown in FIG. 1A, the chassis 101 is substantially parallel to the ground.

When a user wishes to load objects onto the bed 1060, 1061, the user disengages the locking means 111, then actuates the actuation means 110 so as to cause the mechanical arms 109 to pivot, about an arc of a circle oriented in the direction of the arrow $F_1$, which causes the axle 107, and thus the chassis 101 of the trailer 100 mounted thereon, to rotate and lower.

Thus, the user can easily load bulky objects onto the bed 1060, 1061, since the inclination of the chassis 101 with respect to the ground is relatively low (in the order of a few degrees).

Once the one or more objects have been loaded onto the bed, the user can actuate the actuation means 110 so as to cause the mechanical arms 109 and the axle 107 to pivot about an arc of a circle oriented in the direction of the arrow $F_2$.

Such a pivoting results in the straightening of the axle 107, and thus the chassis 101 mounted thereon, until the chassis 101 returns to being substantially parallel to the ground.

When the trailer is in the high position, the user re-engages the locking means 111 so as to prevent the rotation of the axle 107.

In the embodiment shown, a support S allowing an object, such as a motorcycle, to be held when loaded onto the trailer 100, is disposed on the front bed 1061.

Figure 2:
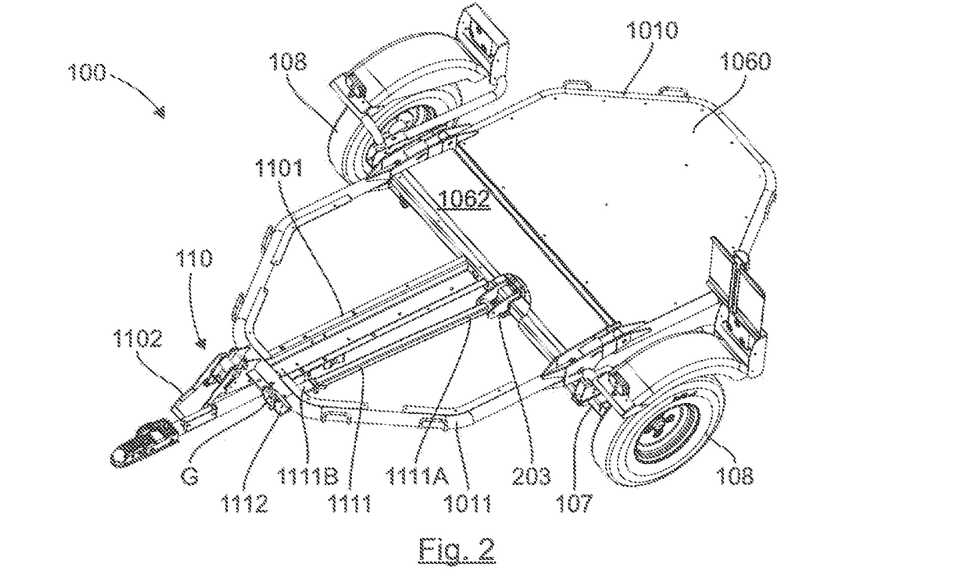
FIG. 2 is an overhead, perspective view of the trailer.
Figure 3:
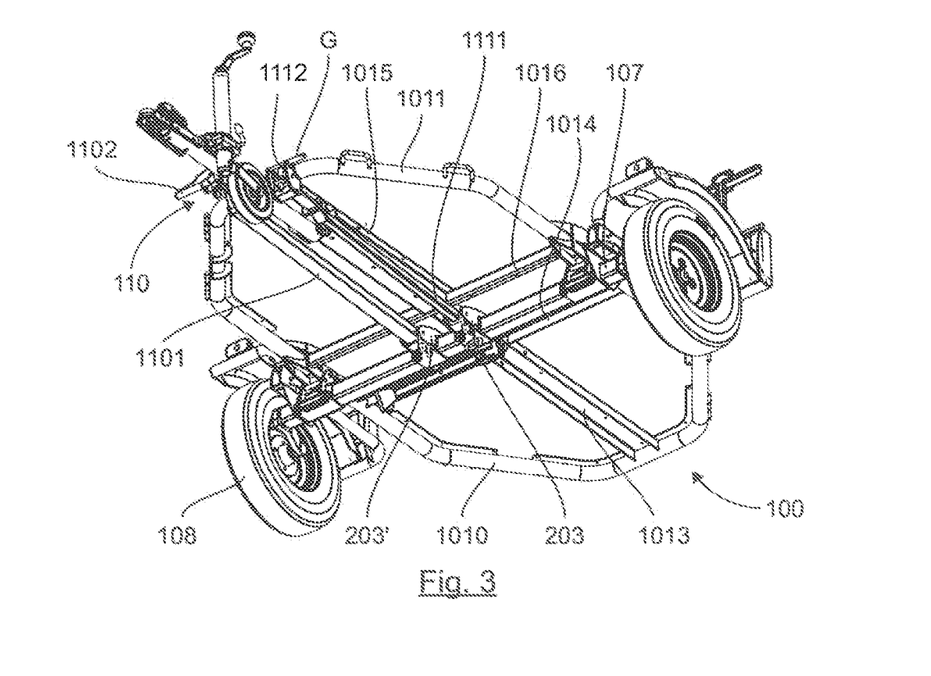
FIG. 3 is a perspective view of the trailer from below.
Figure 4:
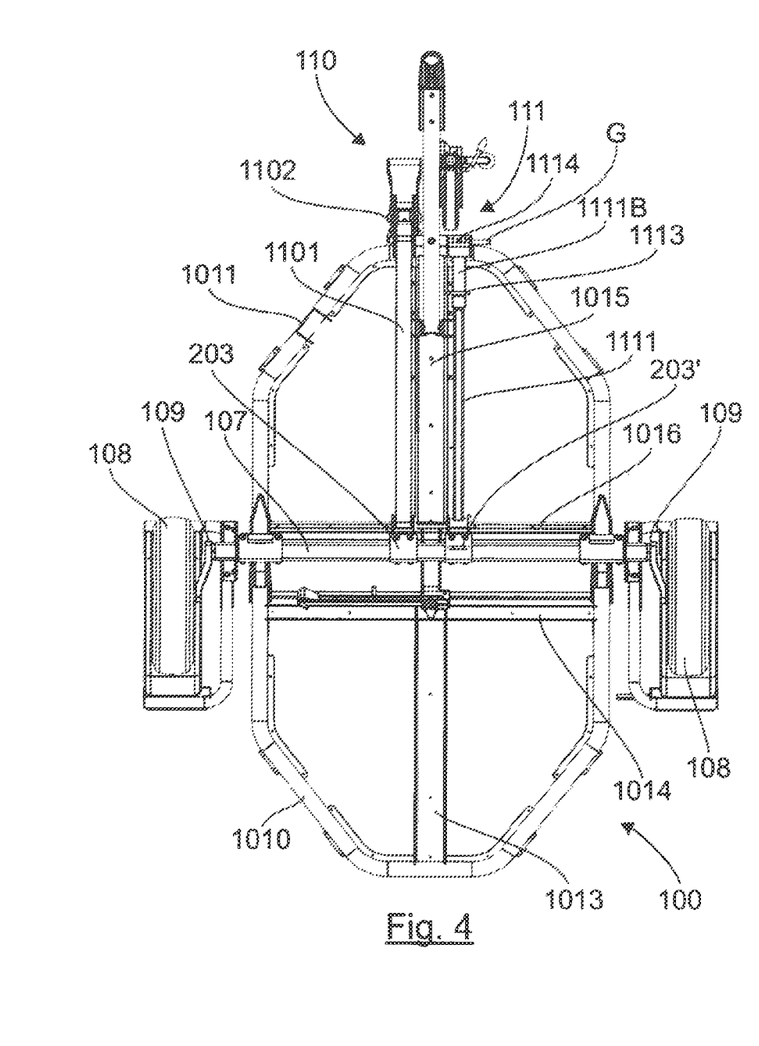
FIG. 4 is a view of the trailer from below.

FIGS. 2 to 4 are views from overhead and from below of the trailer 100 in FIGS. 1A and 1B, which show the structure of the actuation means 110 for tipping the trailer and of the locking means 111.

In the embodiment shown in these figures, the actuation means 110 comprise a flexible element, which is, in this case, a strap 1101 rigidly connected to both the axle 107 and to a tensioner 1102, such as a ratchet tensioner, which is rigidly connected to the chassis 101 (thus producing a receiving system allowing the trailer to be easily raised).

As shown, the ratchet tensioner 1102 is attached to the front chassis and comprises two anchor points for the strap 1101.

As shown in FIG. 3, the strap 1101 passes into an angle part 203' rigidly connected to the axle 107, such that it extends in two parallel planes.

The operation of such a ratchet tensioner 1102, well known to a person skilled in the art, is not described here in detail. It is understood that it allows the tensile force applied to the strap 1011 to be tensioned or released, and thus the length thereof to be adjusted.

The locking means 111 comprise a sliding locking bar or rod 1111, a first end 1111A whereof is mounted such that it pivots on the axle 107, by way of a connecting part 203, and a second end 1111B whereof is mounted such that it moves in translation, substantially along the longitudinal axis D of the trailer, inside a locking mechanism 1112 and a guide ring 1113 attached to the chassis 101.

This guide ring 1113 allows the locking bar 1111 to be retained when the trailer 100 is in the low and storage positions.

The second end 1111B of the locking bar 1111 comprises a slot 1114 (visible in FIGS. 4 and 6A) in which a pin G is intended to be housed when the trailer 100 is in the high position.

Figure 6A:
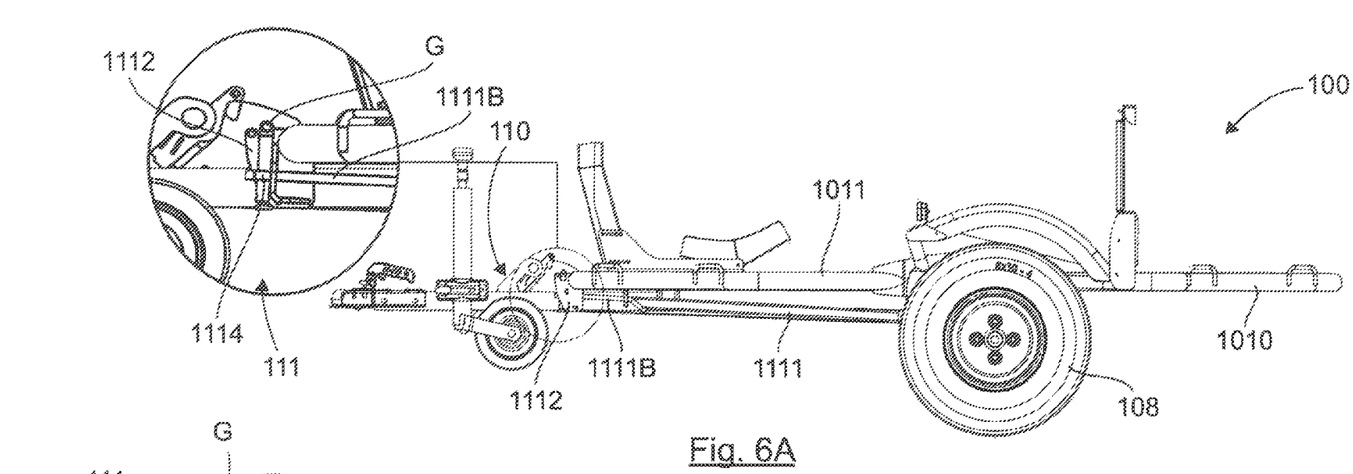
FIGS. 6A and 6B are side views of the trailer in the high position and in the low position respectively.

When the pin G is housed in the slot 1114, it cooperates with the locking mechanism 1112 and thus prevents the locking bar 1111 from being displaced, and thus the axle 107 from rotating, when the trailer is in the high position.

Moreover, the rear chassis comprises a centre beam 1013 and a crossbeam 1014, in particular for increasing the mechanical strength of the rear chassis.

Similarly, the front chassis comprises a centre beam 1015 and a crossbeam 1016.

The centre beam 1015 bears the guide element 1113 and the drawbar 1012, the ratchet tensioner 1102 and the locking mechanism 1112 being rigidly connected to the front frame 1011.

FIGS. 5A and 5B are detailed, section views of the trailer 100, in the vicinity of a lateral wheel 108 thereof, when the trailer is in the high position and in the low position respectively.

These figures provide details on the arrangement and kinematics of the different elements forming the trailer situated in the vicinity of each lateral wheel 108.

A mechanical arm 109 has a first end rigidly connected to a wheel 108 for rotation therewith, and a second end rigidly connected to the axle 107 for rotation therewith.

Two hinge parts 201, 202 attached to one another by bolting about the external tube 107A of the axle 107, allow the axle 107 to be rigidly connected to the chassis of the trailer 100.

More specifically, the hinge part 202 is rigidly connected, such that it pivots, to the connection means 102 in the space formed between the rear frame 1010 and front frame 1011.

Moreover, the strap 1101 of the control means is connected to the axle 107 by way of an angle part 203' and the locking bar (not shown) of the locking means 111 is connected to the axle 107 by way of a connecting part 203.

It should be noted that the solution involving the pivoting of the axle described here allows the conventional internal suspension used on most luggage trailers, implementing four rubber profiles 204 integrated between the two square tubes 107A, 107B forming the axle 107, to be kept.

The rubber profiles 204 thus form suspension means for the trailer 100.

The trailer of the invention is thus advantageous in that it can implement a standard commercially-available axle.

When the user wants to tip the trailer 100 from the high position to the low position to load objects into the bed, the user disengages the locking means 111 by removing the pin G to allow the axle 107 to rotate and the chassis to move.

The user then actuates the ratchet tensioner in order to elongate the strap 1101.

The elongation of the strap 1101 allows, under the effect of gravity exerted on the trailer, the axle 107 to be driven in rotation about an arc of a circle oriented in the direction of the arrow $F_1$.

The trailer is then in the low position.

Once the one or more objects have been loaded onto the trailer 100, the user actuates the ratchet tensioner to reduce the length of the strap 1101 so as to pull on the axle 107.

The tensile force applied on the axle 107 allows same to rotate about an arc of a circle oriented in the direction of the arrow $F_2$.

As shown in FIG. 5B, when the trailer 100 is in the low position, the axle 107 and the hinge parts 201, 202 are housed inside a hollow space 1025 formed in the lower part of the connection means 102 and situated between the front frame 1011 and rear frame 1010 of the chassis (i.e. in the bed of the trailer), which allows the front and rear chassis to be aligned in the same plane, and the inclination of the chassis 107 relative to the ground to be minimised.

Figure 6B:
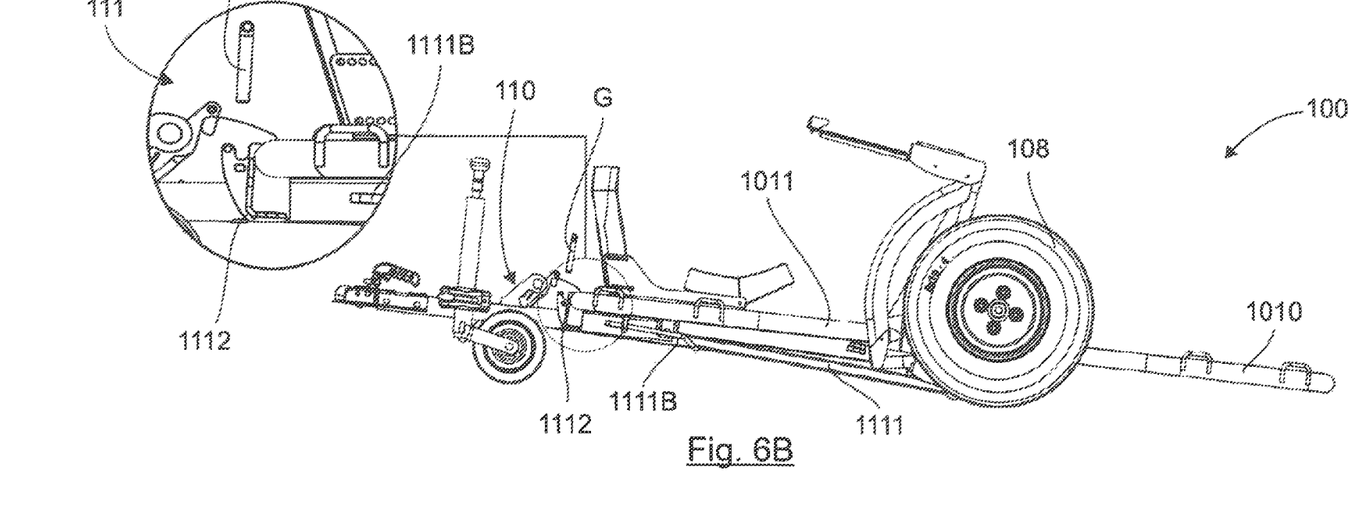

FIGS. 6A and 6B are side views of the trailer 100 respectively in the high (locked) position and in the low (unlocked) position.

These figures show the arrangement and the kinematics of the locking means 111 preventing the trailer 100 from tipping, when in the high position.

When the trailer 100 is in the high position (FIG. 6A), the locking mechanism 1112, rigidly connected to the front frame 1011 of the chassis, holds the locking bar 1111 by way of the pin G which is housed in the slot 1114 made in the front end 1111B of the locking bar 1111.

In other words, the locking bar 1111 is fixed relative to the chassis, the immobilisation of the locking bar 1111 preventing the axle 107 from rotating and the trailer 100 from being lowered.

Thus, the locking means 111 improve the reliability of the trailer 100 by reducing the risks of any unwanted tilting thereof.

When the user wants to tip the trailer 100 into the low position to load objects onto the bed, the user removes the pin G from the locking mechanism 1112, which releases the locking bar 1111 in translation and allows the axle 107 to rotate from the position shown in FIG. 5A to that shown in FIG. 5б.

Thus, the operator only carries out a single manual unlocking operation, by removing the pin G, since manual locking when the trailer is in the high position is central.

The displacement of the axle 107, induced by the actuation means 110 comprising the tensioner 1102 and the strap 1101, causes the locking bar 1111 to slide and the front end 1111B of the locking bar 1111 to be extracted from the locking mechanism 1112.

It is thus the cable or the strap that acts on the axle to cause it to pivot, once the locking bar (or retaining bar) has been released by removing the locking pin.

Figure 7:
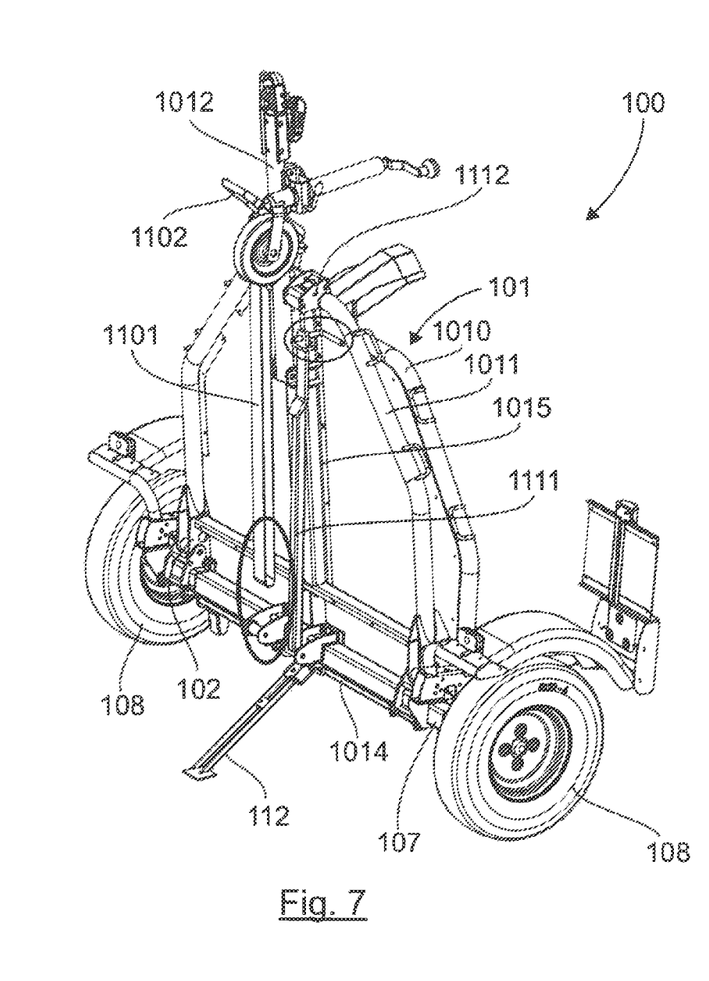
FIG. 7 is a perspective view of the trailer in the folded position (also referred to as the storage position)

FIG. 7 is a view of the trailer in a folded position, referred to as a storage position.

In order to store the trailer in the position shown, the rear bed must be folded back and the trailer must be lowered.

Thus, the user firstly folds the rear chassis towards the front chassis such that the rear frame 1010 and front frame 1011 are disposed facing one another.

Such a folding of the rear chassis towards the front chassis is procured by way of the swivel pins 1021 of the connection means 102 disposed between the rear frame 1010 and front frame 1011.

The user then removes the pin G from the locking mechanism 1112 so as to allow the locking bar 1111 to slide and thus the axle 107 to rotate.

The user then actuates the tensioner 1102 to reduce the tensile force exerted on the strap 1101 to allow the axle 107 to rotate and bring the trailer into the low position (in particular shown in FIG. 1B).

The user then lifts the trailer 100 into the vertical position.

In such a position, the wheels 108 remain in contact with the ground, which allows the trailer to be easily displaced, for example for storage.

A retractable stand 112 supported by the rear chassis, at the crossbeam 1014, allows the trailer 100 to be held vertically.

The trailer 100 is thus in the compact storage position (FIG. 7).

Moreover, since the drawbar 1012 is mounted such that it pivots on the centre beam 1015, it can be bent and folded back to further reduce the overall dimensions of the trailer 100, in particular in the storage position.

Figure 9A:
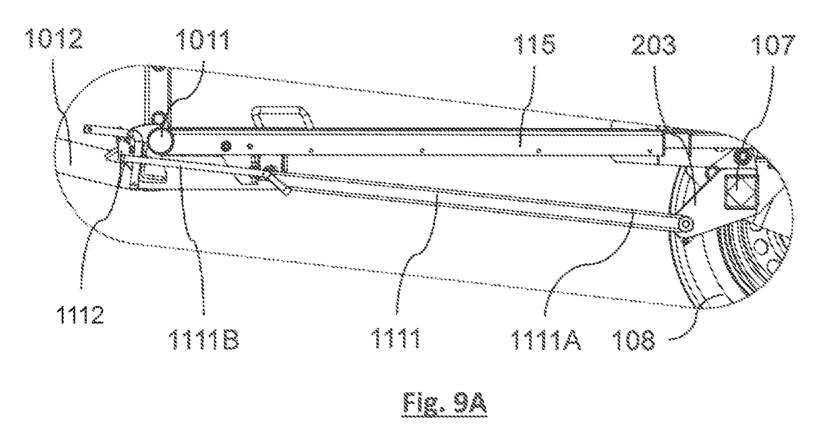
FIGS. 9A and 9B are detailed views of the locking bar with the trailer in the high position or road position (the actuation means are not shown for clarity purposes)
Figure 9B:
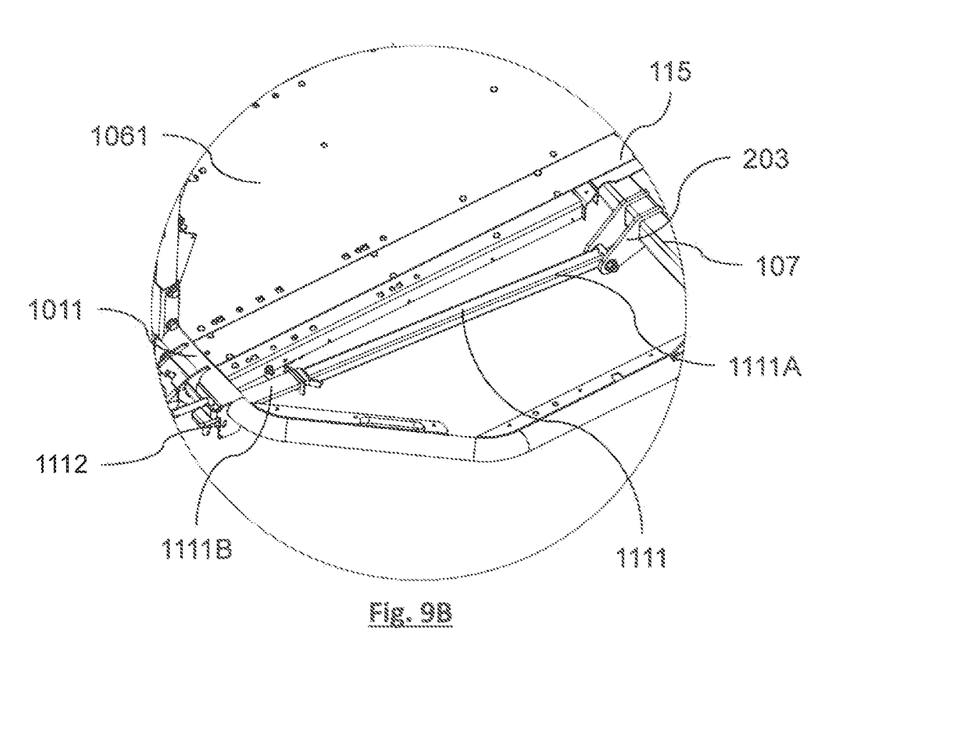

FIGS. 9A and 9B are detailed views of the locking bar 1111 with the trailer in the high position or road position (the actuation means are not shown for clarity purposes).

Figure 10A:
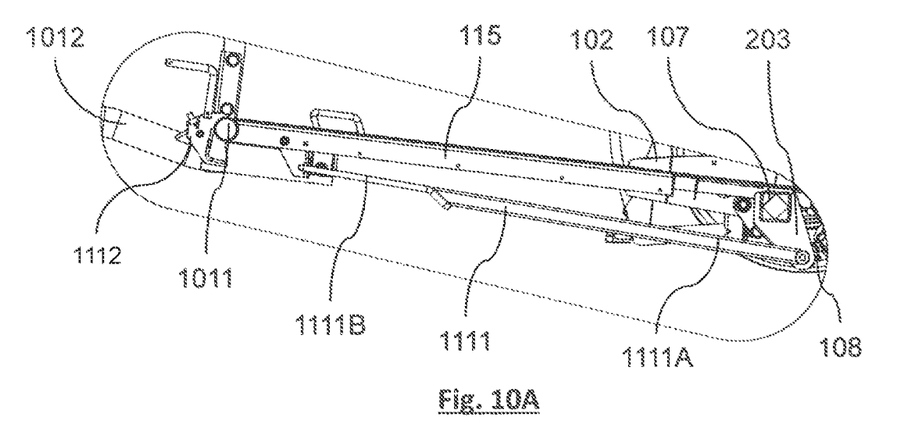
FIGS. 10A and 10B are detailed views of the locking bar with the trailer in the high position (the actuation means are not shown for clarity purposes)
Figure 10B:
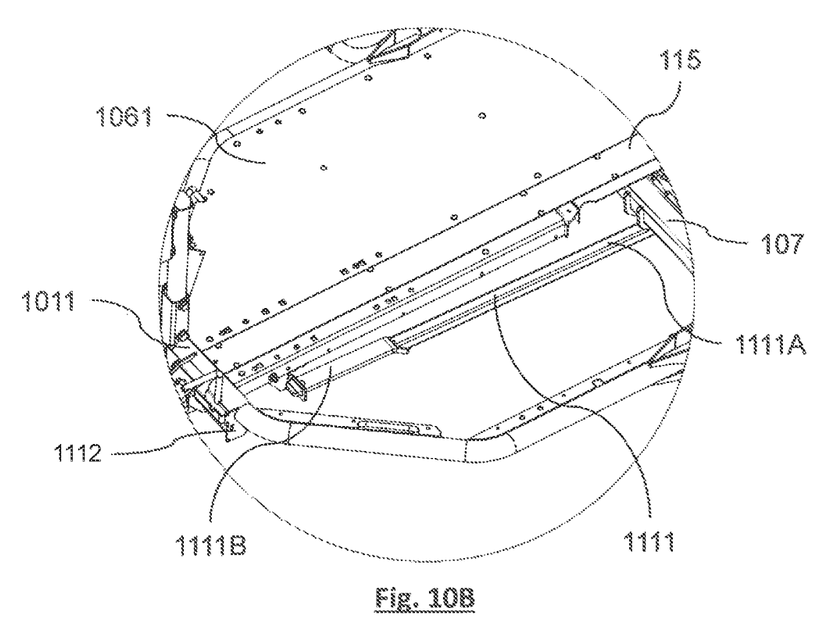

FIGS. 10A and 10B are detailed views of the locking bar 1111 with the trailer in the high position (the actuation means are not shown for clarity purposes).

Figure 11A:
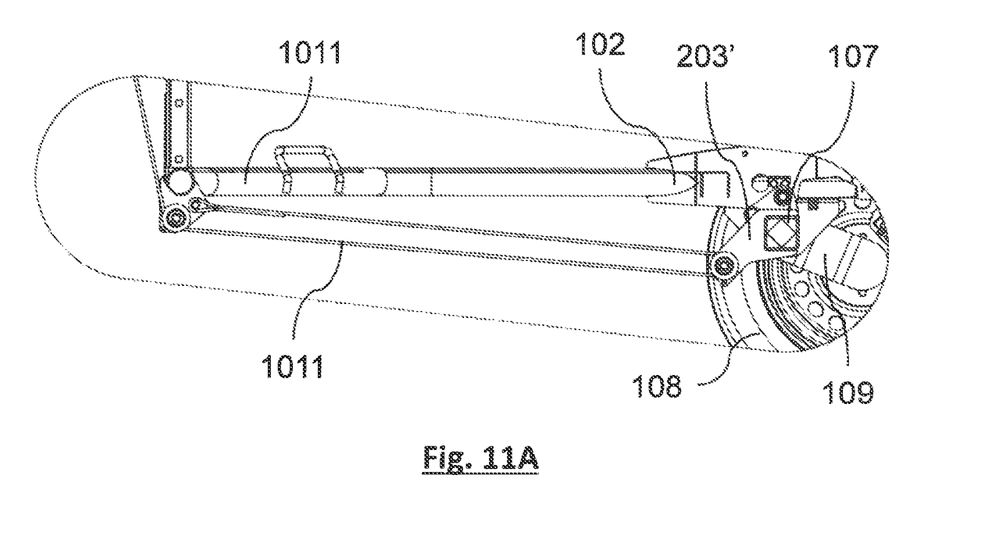
FIGS. 11A and 11B are detailed views of the actuation strap with the trailer in the high position or road position (the locking bar is not shown for clarity purposes)
Figure 11B:
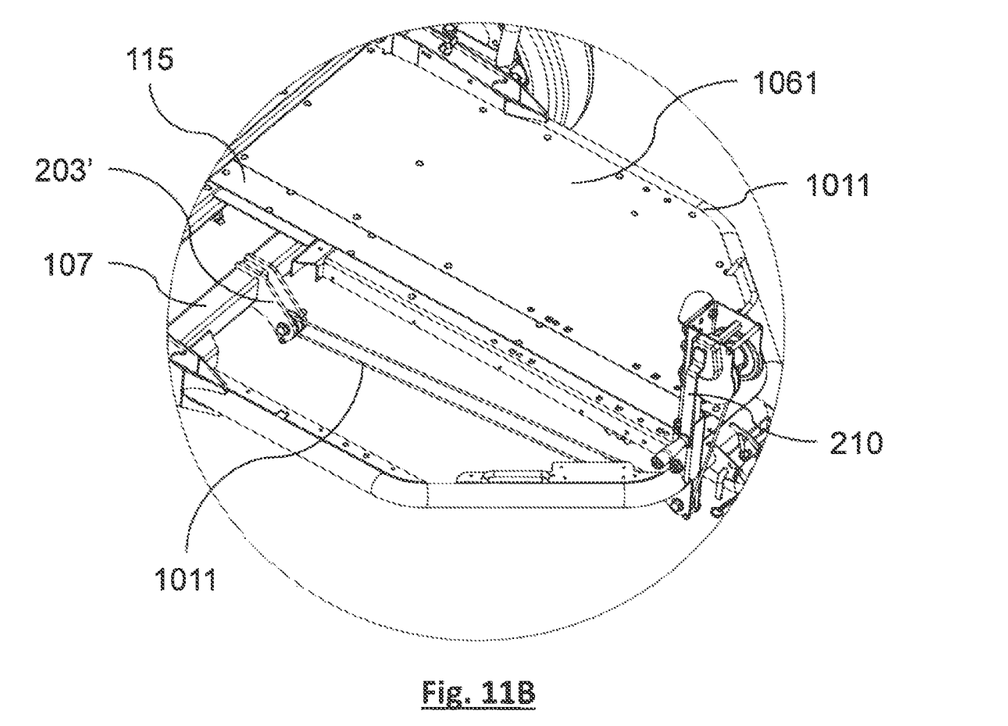

FIGS. 11A and 11B are detailed views of the flexible actuation element 1101 with the trailer in the high position or road position (the locking bar is not shown for clarity purposes). In the example shown, the flexible element is a cable, but a strap can be used as described hereinabove.

Figure 12A:
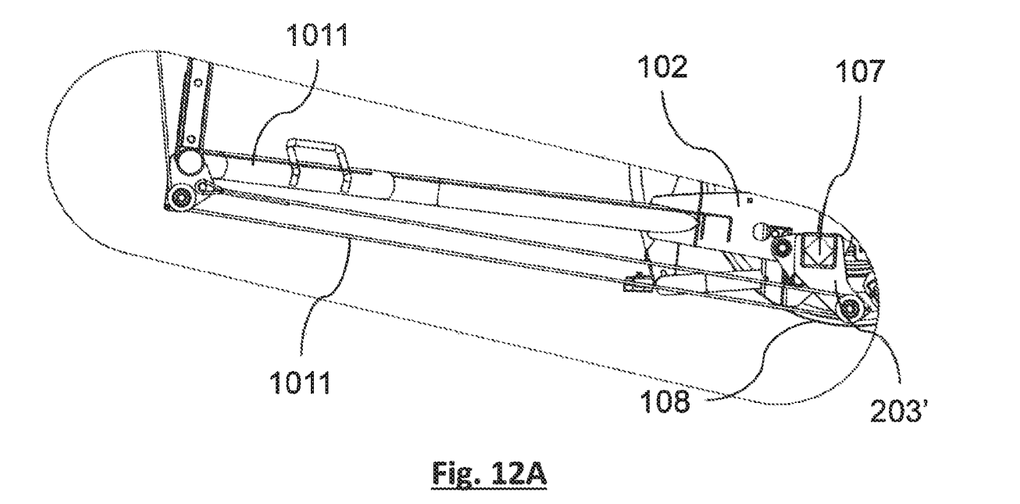
FIGS. 12A and 12B are detailed views of the actuation strap with the trailer in the high position (the locking bar is not shown for clarity purposes).
Figure 12B:
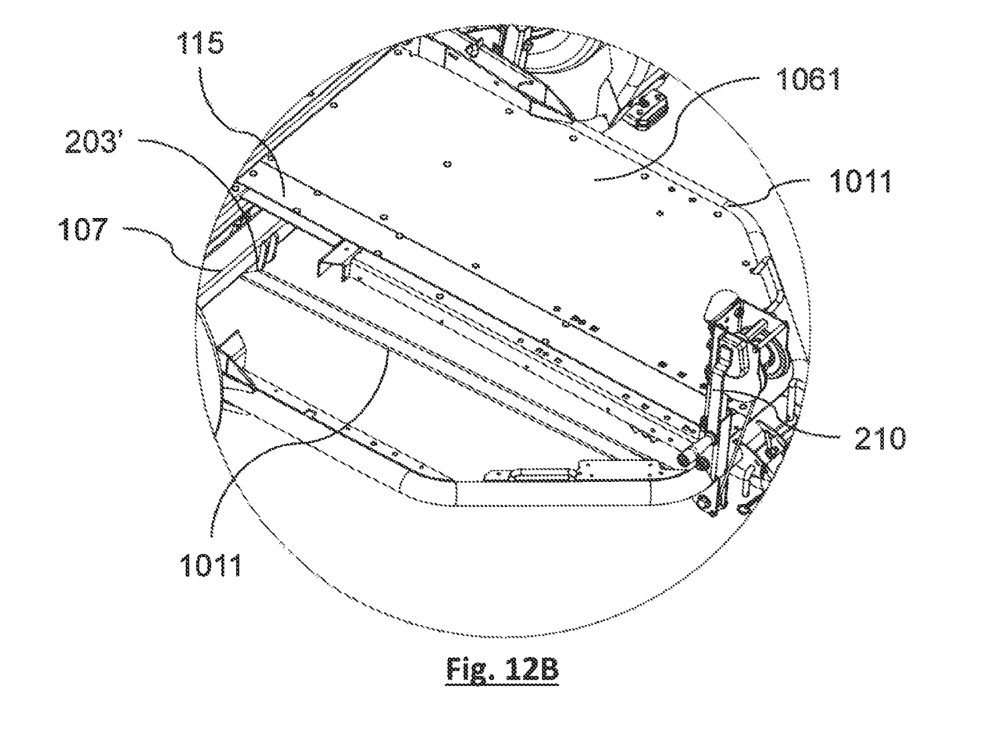

FIGS. 12A and 12B are detailed views of the flexible actuation element 1101 with the trailer in the high position (the locking bar is not shown for clarity purposes). In the example shown, the flexible element is a cable, but a strap can be used as described hereinabove.

In the embodiment shown, the actuation means 110 for actuating the tipping of the trailer 100 are manual means.

However, these actuation means can be motor-driven.

Moreover, the pin can be replaced by any other element, such as a rivet for example, allowing the locking bar to be rigidly connected to the locking mechanism.

In the embodiment shown in FIG. 1A to 7, the means for actuating the pivoting of the axle and the tipping of the trailer comprise a strap connected to a tensioner.

Figure 8:
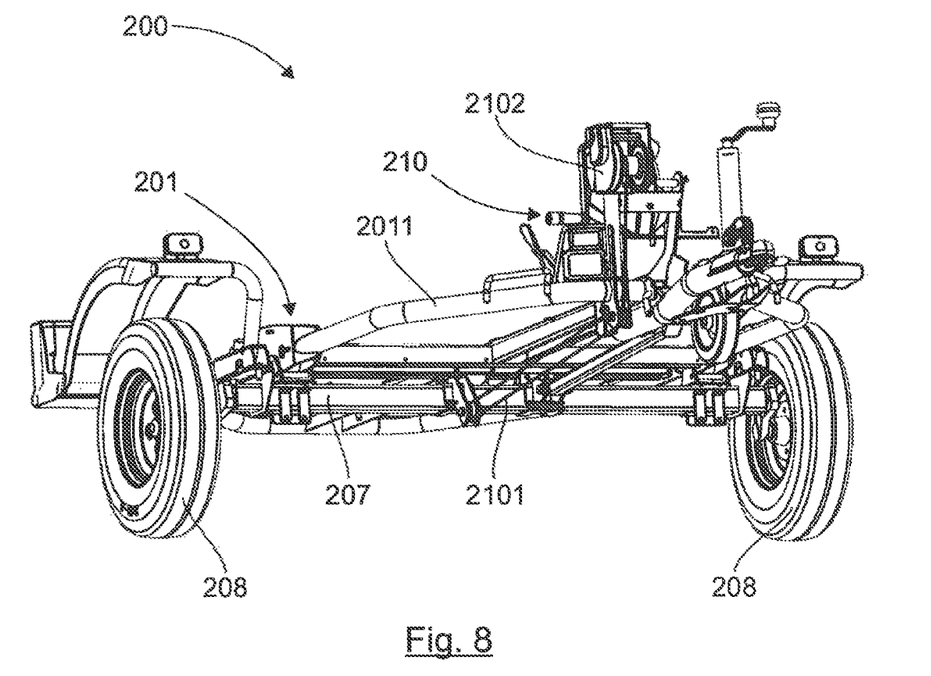
FIG. 8 is a perspective view of a tiltable trailer according to another embodiment of the invention, in the road position.

In another embodiment shown in FIG. 8, the means 210 for actuating the pivoting of the axle 207 relative to the wheels 208 and the tipping of the trailer 200 comprise a flexible cable 2101, forming the flexible element, connected to a winch 2102 for winding the cable.

As described hereinabove, these actuation means 210 allow the position of the chassis 201 to be varied relative to the ground.

The flexible cable 2101 is rigidly connected to the axle 207 and the winch 2102 for winding the cable is attached to the chassis 201.

More specifically, the winch 2102 is attached to the front frame 2011 of the chassis 201.

At least one embodiment of the present application overcomes the various disadvantages of the prior art.

More specifically, at least one embodiment provides a trailer that complies with European road safety standards.

At least one embodiment provides such a trailer, the production cost whereof is relatively low.

At least one embodiment provides such a trailer that can implement a standard, commercially-available axle.

At least one embodiment provides such a trailer that is capable of lowering a chassis with a small inclination, in the order of 3 to 5 degrees relative to the ground.

At least one embodiment provides such a trailer that can be tilted or raised quickly.

At least one embodiment provides such a trailer that allows the load bed thereof to be tilted in a gentle manner.

Although the present disclosure has been described with reference to one or more examples, workers skilled in the art will recognize that changes may be made in form and detail without departing from the scope of the disclosure and/or the appended claims.

The invention claimed is:

1. A tiltable trailer that can assume a high, or road, position, and a low loading position in which the trailer is tilted with respect to the ground, the trailer comprising:
   wheels;
   an axle that pivots with respect to the wheels;
   a chassis mounted on the axle;
   an actuator, which is connected to actuate the pivoting of said axle relative to the wheels in such a way as to move said chassis with respect to the ground; and
   a lock, separate from the actuator, comprising a sliding locking bar,
   wherein said actuator comprises at least one flexible element rigidly connected to said axle, said flexible element being a strap or a cable, and a tensioner to adjust tension of said flexible element attached to said chassis, and
   wherein said sliding locking bar comprises a first end rigidly connected to said axle and a second end cooperating with a locking mechanism, mounted on said chassis, when the trailer is in the high position to lock the trailer in the high position.

2. The trailer according to claim 1, wherein said flexible element is a strap and said tensioner is a ratchet tensioner.

3. The trailer according to claim 1, wherein said flexible element is a cable and said tensioner is a winch for winding said cable.

4. The trailer according to claim 1, wherein the second end of the locking bar comprises a slot configured to receive a locking pin when the trailer is in the high position.

5. The trailer according to claim 1, wherein said chassis comprises a rear frame and a front frame, wherein the rear frame is connected to the front frame such that the rear frame pivots so as to allow said trailer to be folded.

6. The trailer according to claim 5, wherein the rear frame of the chassis is connected to the front frame by a connection situated on either side of said trailer, said connection supporting a swivel pin for pivoting the rear frame relative to the front frame.

7. The trailer according to claim 6, wherein said connection has a space situated between said rear frame and front frame to receive said axle when the trailer is in the low position.

8. The trailer according to claim 1, wherein the trailer further comprises a retractable stand mounted on said chassis.

9. The trailer according to claim 1, wherein the trailer comprises a drawbar supporting a hitch tongue rigidly connected to said chassis by way of a pivot link allowing said drawbar to be folded back relative to said chassis.

10. The trailer according to claim 1, wherein the trailer comprises a suspension situated inside said axle.

11. The trailer according to claim 1, wherein said axle comprises an outer tube in which an inner tube is mounted, said inner tube comprising ends, each end of the inner tube being rigidly connected to a respective one of the wheels, the chassis being rigidly connected to the outer tube.

* * * * *